United States Patent

Zamel et al.

[11] Patent Number: 6,052,396
[45] Date of Patent: Apr. 18, 2000

[54] THERMAL RADIATION SHIELD FOR LASER GAIN MODULE

[75] Inventors: James M. Zamel, Hermosa Beach; John A. Szot, Chino, both of Calif.

[73] Assignee: TRW Inc., Redondo Beach, Calif.

[21] Appl. No.: 09/026,384

[22] Filed: Feb. 19, 1998

[51] Int. Cl.$^7$ ............................................. H01S 3/042
[52] U.S. Cl. ........................... 372/34; 372/35; 372/36
[58] Field of Search .......................................... 372/34–36

[56] References Cited

U.S. PATENT DOCUMENTS

| | | | |
|---|---|---|---|
| 4,237,430 | 12/1980 | Liu et al. | 372/34 X |
| 4,730,332 | 3/1988 | Hoag | 372/34 X |
| 4,734,916 | 3/1988 | Hoag | 372/34 X |
| 4,815,091 | 3/1989 | Hara et al. | 372/34 X |
| 5,544,191 | 8/1996 | Ohzu et al. | 372/34 X |
| 5,790,575 | 8/1998 | Zamel et al. | 372/35 |

Primary Examiner—John D. Lee
Attorney, Agent, or Firm—Michael S. Yatsko

[57] ABSTRACT

A solid state laser apparatus 10 including a laser gain module 12 for generating high energy laser beams 50 and 52 accompanied by non-lasing radiation 60 which, generates heat in the environment of the laser gain module and the apparatus, generally having an adverse affect on the performance of the apparatus. A heat shield 14 encloses the laser gain module to absorb the non-lasing radiation 60 to shield the components surrounding the shield against temperature increases above levels that adversely affect the laser performance and shields the reflective units 20 and 22. Affixed to the heat shield 14 is a cooling pipe 66 which provides coolant to the roof 64 of the heat shield 14 removing the heat that is absorbed. The pipe 66 is connected to a heat exchanger and pump 24 that circulates coolant through the piping. The heat shield 14 and the cooling apparatus 66 and 24 are designed to keep the temperature increases within 20° C. of the nominal base operating temperature for a particular system.

15 Claims, 2 Drawing Sheets

THERMAL RADIATION SHIELD FOR LASER GAIN MODULE

BACKGROUND OF THE INVENTION

1. Technical Field

This invention relates to high energy laser apparatus and more particularly to structures for shielding the environment of the laser gain module against the nonlasing radiation that accompanies the generation of the high intensity, high energy laser beam.

2. Discussion

High energy laser systems have demonstrated utility in industrial applications, having been successfully applied in a wide range of manufacturing and production operations ranging from welding automobile body frames to drilling small holes in metal The laser systems are reliable and perform tasks rapidly and with precision.

In testing a new high energy laser system particular attention should be given to the heat generated in the environment of the laser gain module. Applicant has found that the generation of a high energy laser beam is typically accompanied by a significant amount of heat generated due to the nonlasing radiation. Applicant has further determined that a large proportion of the heat put out by the apparatus finds itself in the nonlasing radiation. By applicant's estimate only 30% of the radiation that is generated by the gain module ends up in the form of the high intensity laser beam and the remainder goes into nonlasing radiation. The nonlasing radiation tends to heat up the operating environment in the immediate vicinity of the gain module which results in an adverse effect on the performance of the apparatus.

A brief explanation of the construction and operation of the high energy laser system may be helpful to better understand the basis for the need to provide shielding structures that control the temperature levels in the operating environment of the gain module. A high energy laser apparatus will generally comprise a solid state laser source comprising a zig-zag slab amplifier positioned between resonator mirrors. The beam is amplified from the zig-zag slab reflecting the light beam back and forth through the slab amplifier. The amplified beam is extracted from the slab in the form of a high quality, high brightness beam with an average beam power of 100 watts to 5000 watts or more. The apparatus generates a great deal of heat not only in the form of the high intensity laser beam but from the arrays of laser diodes that excite the laser slab medium. The nonlaser heat energy if not removed heats up the operating environment of the slab amplifier and the immediate space surrounding the gain module raising the temperature of the space through which the high intensity beam must pass in order to reach its designated working site.

As is well known the quality of the laser beam is affected by the changes in the refractive index of the atmosphere air through which it is generated or otherwise must pass. As the space surrounding the laser gain module heats up due to the nonlasing heat it changes the refractive index of the ambient air. Wide variations in temperature will cause variations in the refractive index of the air through which the high intensity beam must pass. This condition is known to degrade the beam quality.

Rising temperatures in and around the gain module will result in other deleterious effects on the optics and other instruments that respond adversely to thermal expansion. Accordingly, the critically aligned optical system, including the reflective surfaces will distort making it difficult to focus the high intensity beam or point it to the work site. There is a significant need to control and contain the temperature level within and around the gain module to produce an appropriately high quality laser beam that can be used in commercial applications.

SUMMARY OF THE INVENTION

The present invention resides in a heat shield that protects the environment surrounding the gain module against the adverse effect of high temperatures caused by the radiation that escapes from the gain module. Such radiation is extraneous to producing the high intensity laser beam and is "non-lasing" type radiation. There is provided as part of the gain module a conductive heat shield comprising wall and roof structures for enclosing the gain module containing the non-lasing radiation that otherwise escapes into the environment of the gain module. The heat shield comprises a conductive metal enclosure and is equipped with heat removal means for removing the heat absorbed into the heat shield. The enclosure is equipped with cooling means for exchanging the absorbed heat with a cooling media affixed to the enclosure such as a coolant flowing in heat conductive piping affixed to the walls and/or the roof of the enclosure.

The liquid containing conduit is connected to a chilling unit where the absorbed heat is removed from the coolant, which is then recirculated to the enclosure.

The enclosure is formed so that the wall and roof structure closely surround the perimeter of the gain module thereby leaving a minimum of air space surrounding the gain module to more effectively capture the non-lasing radiation emitted from the laser slab.

BRIEF DESCRIPTION OF THE DRAWINGS

It will be appreciated from the foregoing that the present invention represents a significant advance in the field of high brightness laser sources of moderate to high power. Additional aspects and advantages of the invention will become apparent from the following or detailed description, taken in conjunction with the following drawings.

DETAILED DESCRIPTION OF THE PREFERRED EMBODIMENT

Figure 1:
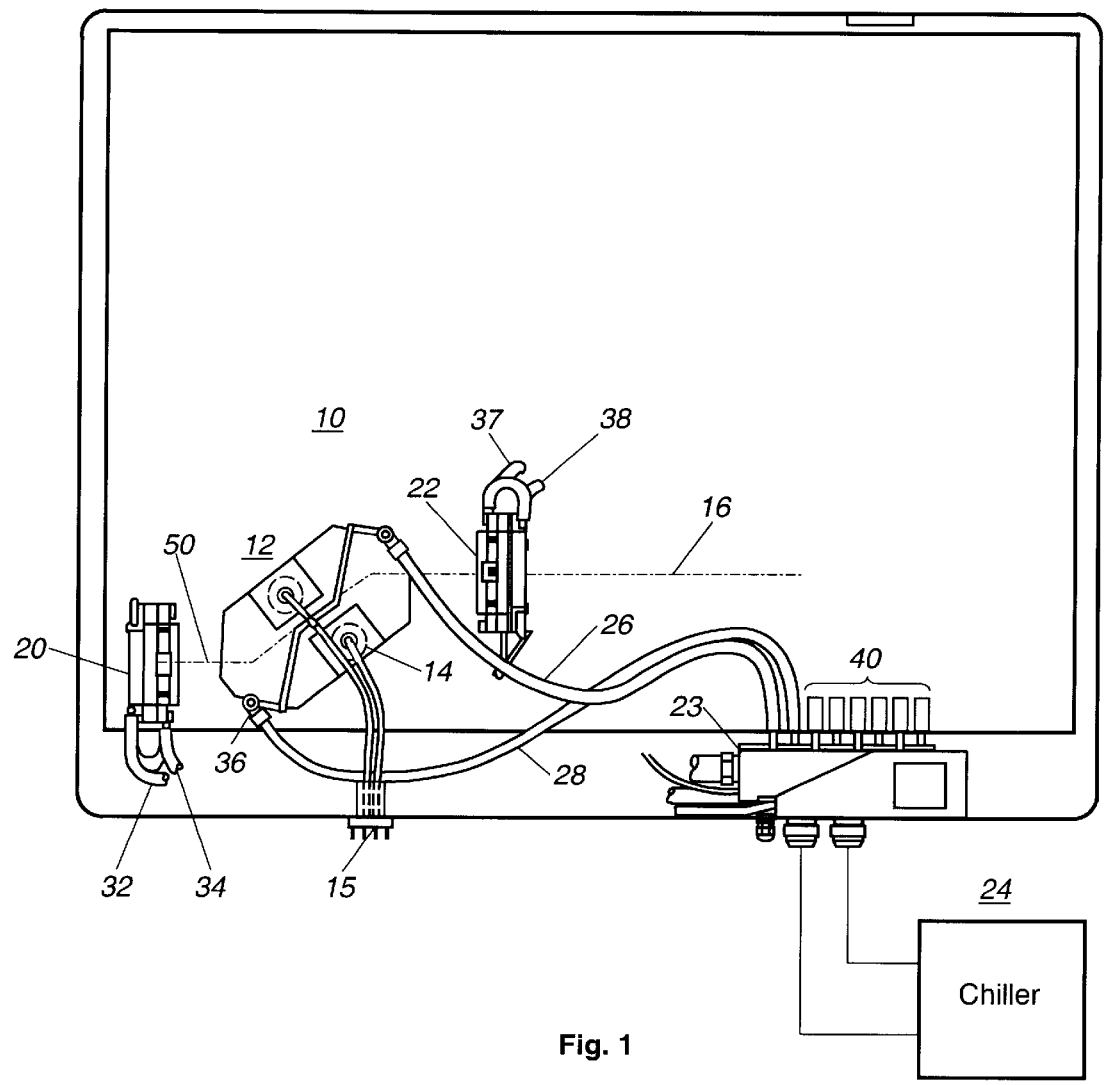
FIG. 1 is a plan view of the apparatus that generates the high intensity laser beam including the laser gain module and the associated optical system and the apparatus for cooling the environment.
Figure 2:
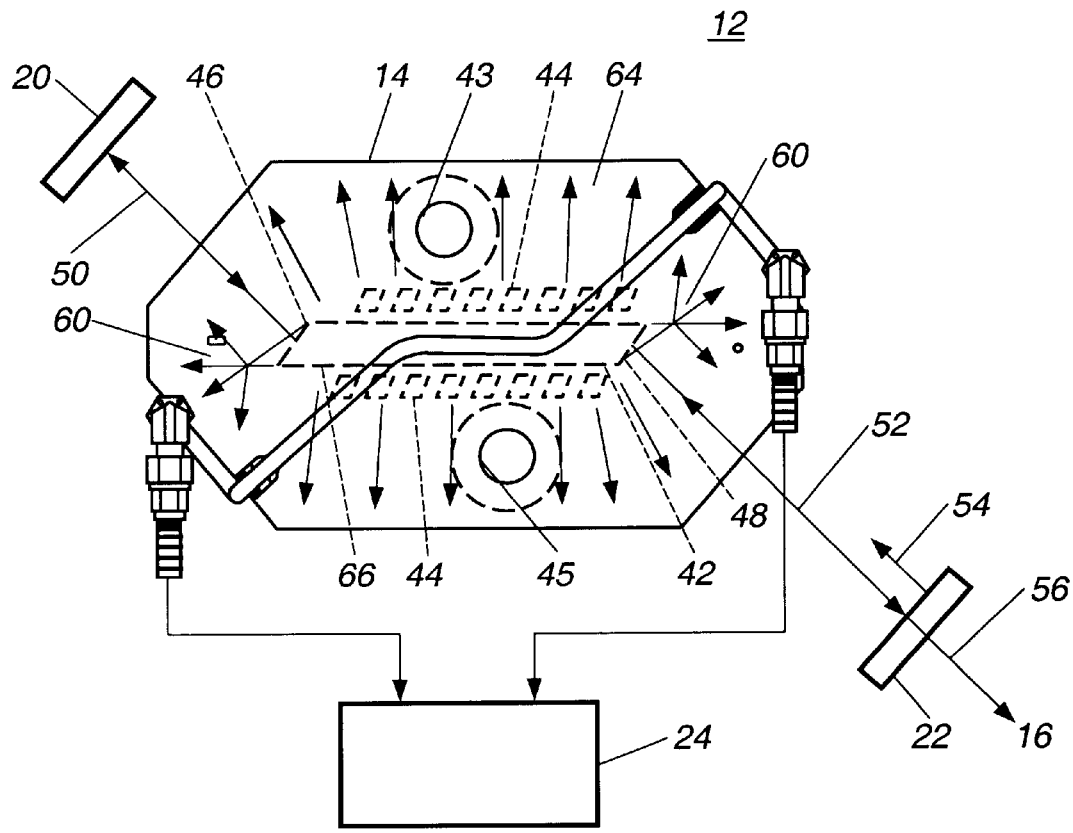
FIG. 2 is a top view of the laser gain module showing the roof structure and the general outline of the heat shield and the accompanying chiller unit.

Referring to FIGS. 1 and 2, there is shown the laser generator apparatus identified with the general reference numeral 10 which includes the laser gain module identified generally with reference numeral 12. The laser generating apparatus 10 comprises the laser gain module 12 connected to a power supply 15. Enclosing the laser gain module 12 is a heat shield 14 and the associated reflecting elements 20 and 22. As described earlier, the laser gain module comprises a single crystal slab, shown in FIG. 2, such Nd:YAG. The Nd:YAG Crystal is excited by directing radiation from banks of laser diodes 44 that extend longitudinally along the side of the crystal slab. The high intensity laser beam is outcoupled and directed along a path identified by the arrow 16.

There is provided a heat exchange unit which includes a pumping device 24 that circulates the coolant through appropriate piping 23 to the gain module 12, forming an active cooling system for gain module. There is provided a bank of laser diodes providing radiation sources 44 for exciting the gain module shown in FIG. 2.

The cooling system which includes the heat exchanger and pump 24 and piping 23 provides the coolant, typically cooling water, to the roof structure 64 (FIG. 3) of heat shield 14. Other kinds of liquid coolants may be employed such as light oils and glycols. The cooling pipes 26 and 28 are affixed to roof 64 and are connected from the heat exchanger 24 to the top of the pipe fitting 36. It will be appreciated that the reflecting elements 20 and 22 are similarly equipped with cooling pipes 32 and 34 and 37 and 38 which are also attached to the heat exchanger at the appropriate outlets cumulatively identified as 40. The arrangement of cooling the gain module as well as the reflecting elements 20 and 22 provides the desirable control of the temperature of the environment of the apparatus 10.

Referring to FIG. 2 there is shown the details of the shielded gain module 12. The critical parts of the gain module is the laser slab 42 shown in dotted outline flanked on either side by banks of laser diodes 44. The power supply 15 is connected to the laser diodes through connectors 43 and 45 through the roof 64 of the heat shield 14. It will be understood the laser slab 42 is a single crystal formed with its front and back faces 46 and 48 cut a sharp angle so that the radiation enters at an angle and zig-zags through the longitudinal extent of the slab. The reflecting element 20 (FIG. 1) is a totally reflecting device reflecting back almost all of the impinging radiation 50 back to the front face 46 of the slab 42 to be amplified. At the other end of the slab but external to the heat shield 14 is the outcoupling unit 22. It is partially transmissive of the impinging radiation beam 52 reflecting back part of beam 54 and out-coupling (transmitting) the other portion 56 along path 16.

The radiation patterns generated in the immediate surroundings of laser gain module as illustrated in FIG. 2, includes the useable coherent lasing radiation beams 50, 52, 54 and 56. As shown in FIG. 2 there is also produced non-lasing radiation shown in the series of arrows 60 that adversely affects the performance of the out-coupled laser beam 52. The non-lasing radiation 60, can represent from 60%–70% of the total radiation generated by the laser gain module. The non-lasing radiation is absorbed by the structure associated with the gain module 12 generally. The structure experiences thermal expansion and can become very warm and increase the air temperature by convection.

In the absence of the heat shield 14 from FIG. 1, the structure supporting the reflector 20, the out coupler 22, and other components in the laser apparatus would experience thermal expansion so that any pre-set precise mechanical alignment would be disturbed. Additionally, the focusing of the beam 52 (FIG. 2) would be very difficult to control due the increase in air temperature, caused by convection heating of the air generated by the radiated surfaces, which affects the refractive index of air, the medium through which the beams 50, 52 and 54 are propagated. Such variation in the refractive index of the propagating medium would cause the beam to diffuse and become less coherent. It will be appreciated that the gain module 12 as a standard practice is cooled by passing coolant across the lateral surfaces of the laser slab to keep it at a uniform temperature. Notwithstanding the local cooling of the laser slab the convected heat in the immediate vicinity of the slab introduces an added load to the system that disturbs the uniformity of the slab temperature as well.

The heat shield 14 as it responds to the radiated heat will increase in temperature. Across the top of roof 64 there is affixed a length of metal tubing 66 through which is pumped a cooling fluid such as water to transfer the heat from the shield 14 to the cooling fluid. The tubing 66 can be soldered or otherwise attached to the heat shield so it is in heat conductive contact. While the tubing 66 is shown affixed to roof of the shield it can function just as well when affixed to the wall structures but should be located near the concentration of radiation.

Figure 3:
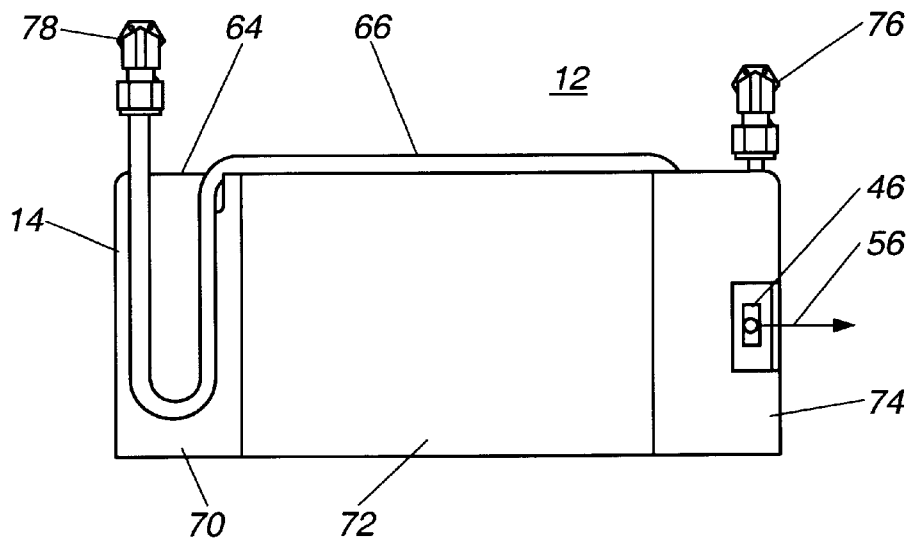
FIG. 3 is an elevation view of the heat shield showing the wall structure and the cooling conduits affixed to the heat shield.

Referring now to FIG. 3 the heat shield 14 is shown in elevation with the wall sections 70, 72 and 74 that form the front view of the heat shield. The other five wall sections (not shown) form the back portion. The coolant inlet and outlet 76 and 78 respectively to the tubing 66 are attached to the free ends of the tubing 26 and 28.

In the instant structure eight wall sections were employed. In some instances it may require a greater number of wall sections depending on the size of the cavity and the disposition of the laser diodes. The thickness of the wall sections and the roof range from 0.0125" to 0.125" in thickness, to conduct varying amounts of waste heat, the preferred being 0.03" to 0.04".

In terms of the temperature control it has been found the nominal air temperature is in the range of 15°–30° C. within the enclosure and the general vicinity of mirrors 20 and 22. If the temperature rises more than 20° C. above the nominal base operating temperature, the operating conditions can become impaired.

Although the present invention has been described in considerable detail with reference to certain preferred versions thereof, other versions are possible. Therefore, the spirit and scope of the appended claims should not be limited to the description of the preferred versions contained herein.

What is claimed is:

1. A laser apparatus, said laser aparatus including a high energy laser gain module capable of generating a high energy laser beam in an environment and concurrently producing heat generating unlased radiation, said high energy laser gain module comprising:

a laser gain medium that is excited by heat generating radiation sources, said laser gain medium being disposed within said environment;

said laser apparatus further including:

first and second resonator mirrors supported in said environment independent of said laser gain medium and spaced from said laser gain medium by portions of said environment, said first mirror being located proximate one end of said laser medium, and said second resonator mirror being located proximate an opposite end of said laser medium and being partially transmissive for permitting transmission of a laser beam emitted by said laser medium into said environment;

heat shield means for enclosing said gain medium and preventing said unlased radiation from escaping into said environment, while permitting radiation to access said mirrors, whereby said unlased radiation is absorbed in said heat shield means in the form of heat, said heat shield means comprising a heat conductive metal enclosure; and active heat removal means for removing the heat absorbed in said heat shield means.

2. The laser apparatus as claimed in claim 1 wherein said heat shield means is made of heat conductive metal.

3. The laser apparatus as claimed in claim 2 wherein said metal is copper or brass.

4. The laser apparatus of claim 2 wherein said heat shield means has a thickness in the range of 0.0125 inches to 0.125 inches.

5. The laser apparatus as claimed in claim 1 wherein said active heat removal means is a heat exchanger.

6. The laser aparatus claimed in claim 5 wherein said heat exchanger comprises conduit means for carrying a coolant liquid in heat conducting contact with said heat shield means for collecting the heat accumulated in said heat shield means.

7. The laser appartus as claimed in claim 6 wherein said coolant liquid is water.

8. The laser apparatus as claimed in claim 6 wherein said metal enclosure of said heat shield means includes a roof; and wherein said conduit means is affixed to said roof.

9. The laser apparatus as claimed in claim 5 wherein said active heat removal means comprises a liquid coolant.

10. The laser as claimed in claim 1 wherein said active heat removal means includes a refrigerant and means to recycle said refrigerant.

11. The laser apparatus set forth in claim 1 wherein said heat shield means comprises a series of metal wall structures and a metal roof structure, said metal wall structures being configured to conform to the perimeter of said laser gain medium.

12. The laser apparatus as claimed in claim 11 wherein said heat generating radiation sources comprise laser diodes.

13. The laser apparatus as claimed in claim 1 wherein said exciting heat generating radiation sources comprise laser diodes.

14. A method of shielding the environment of a high energy laser beam generator against heat generating unlased radiation accompanying the generation of the laser beam from a laser gain medium comprising the steps of:

a. constructing a series of wall members and roof members that conform to the perimeter of said laser gain medium to define a heat shield; and b. cooling said he shield by conductively transferring heat in said wall and roof member to a cooling medium;

c. removing heat from said cooling medium; and d. recycling said cooling medium to said wall and roof members.

15. A laser apparatus, said laser apparatus including a high energy laser gain module capable of generating a high energy laser beam in an environment and concurrently producing heat generating unlased radiation, said high energy laser gain module being disposed in said environment and comprising:

a radiation source, said radiation source comprising a plurality of laser diodes;

a slab laser gain medium, said slab laser gain medium being excited by said radiation source;

a heat conductive metal enclosure defining a heat shield for enclosing said slab laser gain medium and said plurality of laser diodes, said enclosure including a series of wall structures and a roof structure, said wall and roof structures conforming to the perimeter of said laser gain medium, wherein unlased radiation, when generated, encounters said heat shield and is prevented from escaping into said environment, whereby at least some of said unlased radiation is absorbed in said heat conductive metal enclosure and heats said metal enclosure;

cooling means for actively removing heat from said metal enclosure, said cooling means including:

a conduit for carrying a coolant liquid;

said conduit being affixed to said roof to provide a heat exchanging relationship with said roof for conducting heat accumulating in said conductive metal enclosure and transferring said heat to said coolant liquid; and coolant recycling means coupled to said conduit for recirculating said coolant liquid;

said laser further including:

first and second resonator mirrors supported in said environment external of said heat conductive metal enclosure and in spaced relation to said slab laser gain medium, said resonator mirrors being separated from said laser gain module by portions of said environment;

said first mirror being located proximate one end of said slab laser medium, and said second resonator mirror being located proximate an opposite end of said slab laser medium and being partially transmissive for permitting transmission of a laser beam emitted by said laser gain module into said environment; and said enclosure permitting radiation from said high energy laser gain module to access said first and second mirrors.

* * * * *